United States Patent Office 3,272,794
Patented Sept. 13, 1966

3,272,794
ISOTHIURONIUM SALTS OF AMINO BROMO-HYDRIN DYESTUFFS
David Taber, Wilmette, Ill., Edgar E. Renfrew, St. Paul, Minn., and Henry W. Pons, Monroeville, Pa., assignors to American Aniline Products, Inc., a corporation of Delaware
No Drawing. Filed Feb. 3, 1964, Ser. No. 342,251
5 Claims. (Cl. 260—157)

This application is a continuation-in-part of our copending application Serial No. 160,330, filed December 18, 1961, and now U.S. Patent No. 3,152,113.

This invention relates to new dyestuffs and to the coloring of cellulosic and other textile materials therewith. In one specific aspect, it relates to new reactive water-soluble dyestuffs having attached thereto at least one isothiuronium salt of an amino bromohydrin.

In recent years there has been considerable interest in the manufacture of water-soluble dyestuffs containing triazine or pyrimidine rings to which there are attached reactive halogen atoms. These classes of dyestuffs are believed to react with the functional groups of cellulosic and other fibers and, as a result, give colorations which are extremely resistant to wet treatments. The dyestuffs must contain at least one ionogenic solubilizing group; e.g., sulfonic acid or carboxylic acid groups, to make them sufficiently water-soluble to be applied from an aqueous bath. The requirement for at least one sulfonic acid or carboxylic acid group thus imposes a limitation on the type of colored compound that can be used to synthesize the dyestuffs.

We have found that unexpectedly superior water-soluble dyestuffs can be made from water-insoluble dyestuffs free of ionogenic solubilizing groups, by converting water-insoluble dyestuffs containing at least one amino bromohydrin group to isothiuronium salts. Our new dyestuffs, when applied to cellulose or other textiles by dyeing or printing in the presence of an acid-binding agent, react with the fiber to give bright colorations which have good wash fastness.

It is therefore an object of the present invention to provide a new class of water-insoluble dyestuffs solubilized by the presence of at least one isothiuronium salt of an amino bromohydrin group.

In accordance with the invention, we have discovered dyestuffs of the formula:

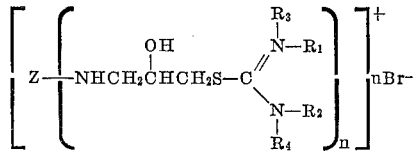

wherein Z is a water-insoluble aromatic colored moiety of the azo, anthraquinone, phthalocyanine or nitro series as recognized by the Colour Index, 2nd edition, 1956; $n$ is a small whole number having a value of from 1 to 4; $R_1$ and $R_2$, as individual substituents, are members selected from the group consisting of hydrogen and lower alkyl and, taken collectively, they represent a methylene bridge having from 2 to 3 carbon atoms, said bridge connecting the N atoms to which $R_1$ and $R_2$ are attached; and $R_3$ and $R_4$ are hydrogen or lower alkyl. The Z term, representing the dyestuff moiety, is free of ionogenic solubilizing groups.

The new dyestuffs can be made by the interaction of one mole of a water-insoluble primary amine of the azo, anthraquinone, phthalocyanine or nitro series with at least one mole of epibromohydrin per amino group to form a water-insoluble amino bromohydrin dyestuff intermediate. This intermediate is converted to its water-soluble isothiuronium salt by reacting it with a thiourea.

In lieu of using epibromohydrin to prepare the 2-hydroxy-3-bromopropylamino intermediates, the arylamines can be reacted with an allyl halide; e.g., allyl chloride, to form an allylamine which, by reaction with hypobromous acid, is converted to the intermediates useful in the invention.

The water-insoluble primary amine colorants of the azo series suitable for making the dyestuffs of the invention can be made in a variety of ways. One method is to couple an arylamine, which is free of other groups convertible to amino groups, with either (1) an arylamino coupling component which accepts diazonium salts without modification, (2) an arylamine containing an amino group protected by a hydrolyzable group which can be converted to a free amine by hydrolysis, or (3) a coupling component containing a nitro group which can be reduced to an amino group after the coupling reaction.

Alternatively, arylamines containing nitro groups can be diazotized and coupled with (1) an arylamino coupling component which accepts diazonium salts without modification, (2) an arylamine containing an amino group protected by a hydrolyzable group, (3) a coupling component free of amino groups, or (4) a coupling component containing a nitro group which can be reduced to an amino group after the coupling reaction. The nitro groups are then reduced to amino groups to form colorants useful in the invention.

Still a further method involves diazotizing arylamines containing acylamido groups and coupling them with (1) an arylamino coupling component which accepts diazonium salts without modification, (2) an arylamine containing an amino group protected by a hydrolyzable group, (3) a coupling component free of amino groups, or (4) a coupling component containing a nitro group which can be reduced to an amino group after the coupling reaction. Hydrolysis of the acylamido group or groups gives the starting materials useful in the invention.

Water-insoluble amines, free of other groups convertible to amino groups, from which diazo compounds can be made include, but are not limited to, aniline, o-, m-, and p-toluidine,
2,4- and 2,5-xylidine,
o-, m-, and p-anisidine,
o-, m-, and p-phenetidine,
o-, m-, and p-choloraniline,
o-, m-, and p-bromoaniline,
o-, m-, and p-fluoroaniline,
2,4- and 2,5-dicholoroaniline,
trichloroaniline,
1-naphthylamine,
2-naphthylamine,
5-aminotetralin,
6-aminotetraline,
2-methyl-1-naphthylamine,
3-methyl-1-naphthylamine,
4-methyl-1-naphythylamine,
5-methyl-1-naphthylamine,
6-methyl-1-naphthylamine, 7-methyl-1-naphthylamine,
8-methyl-1-naphthylamine,
1-methyl-2-naphythylamine,
3-methyl-2-naphthylamine,
4-methyl-2-naphthylamine,
5-methyl-2-naphthylamine,
6-methyl-2-naphthylamine,
7-methyl-2-naphthylamine,
8-methyl-2-naphthylamine,
2-ethyl-1-naphthylamine,
4-ethyl-1-naphthylamine,
7-ethyl-1-naphthylamine,
2,3-dimethyl-1-naphthylamine,
2,6-dimethyl-1-naphthylamine,
1,7-dimethyl-2-naphthylamine,
1-4-dimethyl-2-naphthylamine,
3,6-dimethyl-2-naphthylamine,
4-phenyl-1-naphthylamine,
6-phenyl-1-naphthylamine,
7-phenyl-1-naphthylamine,
6-phenyl-2-naphthylamine,
2-chloro-1-naphthylamine,
3-chloro-1-naphthylamine,
4-chloro-1-naphthylamine,
5-chloro-1-naphthylamine,
6-chloro-1-naphthylamine,
7-chloro-1-naphthylamine,
8-chloro-1-naphthylamine,
1-chloro-2-naphthylamine,
3-chloro-2-naphthylamine,
4-chloro-2-naphthylamine,
5-chloro-2-naphthylamine,
x-halo-y-methyl-1-naphthylamine,
x-halo-y-methyl-2-naphthylamine,
x,y-dihalo-1-naphthylamine,
x,y-dihalo-2-naphthyalmine,
1- or 2-aminoanthraquinone,
o-, m- and p-aminobenzanilide,
o-, m-, and p-aminoacetanilide,
2-and 4-aminodiphenyl ether,
sulfanilamide,
metanilamide,
orthanilamide,
$N^1$-methylsulfanilamide,
$N^1,N^1$-dimethylsulfanilamide,
$N^1$-methylmetanilamide,
o-, m-, and p-aminoacetophenones,
o-, m-, and p-ethylaniline,
o-, m-, and p-isopropylaniline,
dehydrothiotoluidine,
primuline base,
4-benzamido-2,5-diethoxyaniline,
pseudocumidine,
4'-amino-4-nitroacetanilide,
4'-amino-N-ethylacetanilide,
4-amino-2,5-dimenthoxyacetanilide,
p-amino-N-butylbenzamide,
4'-amino-5'-chloro-o-benzanisidide,
3-chloro-o-toluidine,
3-bromo-o-toluidine,
4-bromo-o-toluidine,
4-chloro-o-toluidine,
2-chloro-m-toluidine,
4-chloro-m-toluidine,
2-bromo-m-toluidine,
4-bromo-m-toluidine,
3-bromo-p-toluidine,
2-chloro-p-toluidine,
3-chloro-p-toluidine,
5-methyl-o-anisidine,
2,5-dimethoxyaniline,
2,5-diethozyaniline,
o-, m-, and p-aminophenol,
2-, 3-, or 4-aminodiphenyl,
5-amino-o-toluensulfoanilide,
monobenzoyl-o-toluidine,
monobenzoylbenzidine,
N-phenyl-o-phenylenediamine,
4,4'-diaminodiphenylamine,
N,N-diethyl-p-phenylenediamine,
N,N-dimethyl-p-phenylenediamine and
N-ethyl-p-phenylenediamine.

Useful amines bearing nitro groups which can be diazotized and coupled as described hereabove include
o-, m-, and p-nitroaniline,
3-, 4-, 5-, or 6-nitro-o-toluidine,
2-, 4-, 5-, or 6-nitro-m-toluidine,
2- or 3-nitro-p-toluidine,
3-chloro-2-nitroaniline,
5-chloro-2-nitroaniline,
6-chloro-2-nitroaniline,
2-chloro-3-nitroaniline,
4-chloro-3-nitroaniline,
5-chloro-3-nitroaniline,
6-chloro-3-nitroaniline,
2-chloro-4-nitroaniline,
3-chloro-4-nitroaniline,
2-chloro-6-bromo-4-nitroaniline,
2-amino-6-nitrobenzotrifluoride,
4-methylsulfonyl-2-nitroaniline,
2-methylsulfonyl-4-nitroaniline,
2-nitro-1-napthylamine,
3-nitro-1-naphthylamine,
4-nitro-1-naphthylamine,
5-nitro-1-naphthylamine,
6-nitro-1-naphthylamine,
7-nitro-1-naphthylamine,
8-nitro-1-naphthylamine,
1-nitro-2-naphthylamine,
3-nitro-2-naphthylamine,
4-nitro-2-naphthylamine,
5-nitro-2-naphthylamine,
6-nitro-2-naphthylamine,
8-nitro-2-napthylamine,
8-nitro-5-aminotetralin,
7-nitro-6-aminotetralin,
4-methyl-2-nitro-1-naphthylamine,
5-methyl-2-nitro-1-naphthylamine,
7-methyl-2-nitro-1-naphthylamine,
8-methyl-2-nitro-1-naphthylamine,
4-methyl-3-nitro-1-naphthylamine,
2-methyl-4-nitro-1-naphthylamine,
5-methyl-4-nitro-1-naphthylamine,
6-methyl-4-nitro-1-naphthylamine,
7-methyl-4-nitro-1-naphthylamine,
8-methyl-4-nitro-1-naphthylamine,
2-methyl-5-nitro-1-naphthylamine,
6-methyl-5-nitro-1-naphthylamine,
7-methyl-8-nitro-1-naphthylamine,
1-methyl-4-nitro-2-naphthylamine,
4,6-dimethyl-3-nitro-1-naphthylamine,
2,6-dimethyl-4-nitro-1-naphthylamine,
4-phenyl-2-nitro-1-naphthylamine,
3-chloro-2-nitro-1-naphthylamine,
3-bromo-2-nitro-1-naphthylamine,
4-chloro-2-nitro-1-naphthylamine,
4-bromo-2-nitro-1-naphthylamine,
5-bromo-2-nitro-1-naphthylamine,
4-chloro-3-nitro-1-naphthylamine,
4-bromo-3-nitro-1-naphthylamine,
2-chloro-4-nitro-1-naphthylamine,
2-bromo-4-nitro-1-naphthylamine,
4-bromo-4-nitro-1-naphthylamine,
8-chloro-4-nitro-1-naphthylamine,
1-chloro-5-nitro-2-naphthylamine,
1-chloro-6-nitro-2-naphthylamine,
1-chloro-8- nitro-2-naphthylamine,
2-bromo-5-nitro-2-naphthylamine,
4-bromo-6-nitro-2-naphthylamine, 4-bromo-8-nitro-1-naphthylamine,
3-bromo-1-nitro-2-naphthylamine,
6-bromo-1-nitro-2-naphthylamine,
1-bromo-4-nitro-2-naphthylamine,
1-bromo-5-nitro-2-naphthylamine,
1-bromo-6-nitro-2-naphthylamine,
2,4-dibromo-3-nitro-1-naphthylamine,
2,4-dibromo-5-nitro-1-naphthylamine,
2,4-dibromo-6-nitro-1-naphthylamine,
2,4-dibromo-8-nitro-1-naphthylamine,
2,4-dichloro-5-nitro-1-naphthylamine,
2,4-dichloro-6-nitro-1-naphthylamine, and
4'-amino-4-nitrobenzanilide.

Among the suitable amines bearing acylamido groups that can be diazotized and coupled as described hereabove there are o-, m-, and 1-aminoacetanilide, 3-, 4-, 5-, or 6-aminoacet-o-toluidine, 2-, 4-, 5-, or 6-aminoacet-m-toluidide, 2- or 3-aminoacet-p-toluidide, 3-, 4-, 5-, or 6-aminoacet-y-anisidides, 2-, 3-, 4-, 5-, or 6-aminoacet-y-phenetidides, and 2-, 3-, 4-, 5-, or 6-aminoacyl-y-anisidides.

Among the coupling components which can be coupled with the diazonium salts listed hereabove to form the aminoazo compounds directly, there are included cresidine, 1-naphthylamine, 2-naphthylamine, 2,5-xylidine, m-toluidine, 2,5-dimethoxyaniline, 2,5-diethoxyaniline, 4-methyl-2,5-dimethoxyaniline, 3-methoxy-p-toluidine, m-phenylenediamine, nitro-m-phenylene-diamine, 3'-amino-p - toluenesulfono-p - toluidide, 1 - (m-aminophenyl) - 3 - methyl-5-pyrazolone, 1-(p-aminophenyl)-3-methyl-5-pyrazolone and 3-amino-p-acetotoluidide.

Those arylamines which contain an amino group protected by a hydrolyzable group which is converted to a free amino group after hydrolysis included o-anisidine-ω-methanesulfonic acid, 1-(p-acetamidophenyl)-3-methyl-5-pyrazolone and o-toluidinemethanesulfonic acid.

Coupling components which do not contain an amino group and must therefore be coupled with either a diazonium salt bearing nitro groups or acylamido groups which can then be converted to free amino groups or a diazonium salt having attached thereto a 2-hydroxy-3-bromopropylamino group include phenol, o-, m-, and p-cresol, o-, m-, and p-chlorophenol, o-, m-, and p-ethoxyphenol, o-, m-, and p-methoxyphenol, o-, m-, and p-bromophenol, catechol, resorcinol, o-, m-, and p-dimethylaminophenol, 1-naphthol, 2-naphthol,
6-hydroxytetralin,
5-hydroxytetralin,
6-ethyl-5-hydroxytetrolin,
2,6-dimethyl-1-napthol,
4,8-dimethyl-2-naphthol,
2-, 3-, 4-, 5-, 6-, 7-, or 8-methyl-1-naphthol,
3-, 4-, 5-, 6-, 7-, or 8-methyl-2-naphthol,
2-, 3-, 4-, 5-, 6-, 7-, or 8-chloro-2-naphthol,
2-, 3-, 4-, 5-, 6-, 7-, or 8-bromo-1-naphthol,
3-, 4-, 5-, 6-, 7-, or 8-bromo-2-naphthol,
1-anthrol,
2-anthrol,
3-hydroxy-2-naphthamide,
N-methyl-3-hydroxy-2-naphthamide,
3-hydroxy-2-naphthanilide
and those compounds of this series commonly known as the naphtols (CI 37505 to CI 37580),
5-oxo-1-phenyl-2-pyrozoline-3-carboxamide,
ethyl 5-oxo-1-phenyl-2-pyrozolne-3-carboxylate,
1-(m-chlorophenyl)-3-methyl-5-pyrazolone,
3-methyl-5-pyrozolone,
3-methyl-1-phenyl-5-pyrazolone,
3-methyl-1-(p-nitrophenyl)-5-pyrazolone,
3-methyl-1-(p-chlorophenyl)-5-pyrazolone,
3-methyl-1-(m-sulfamylphenyl)-5-pyrazolone,
3-methyl-l-(m-nitrophenyl)-5-pyrazolone,
acetoacetanilide,
o-acetoaceto-toluidide,
2,4-acetoacetoxylidide,
o-ocetoacetanisidide,
2,5-dimethoxy-acetoacetanilide,
4-chloro-2,5-dimethoxyacetoacetanilide,
o-chloroacetanilide,
2-(N-ethylanilino)ethanol,
3-N-ethylanilino-1,2-propandiol,
2-(N-butylanilino)-ethanol,
2,2'(m-chlorophenylimino)diethanol,
2-(m-tolylimino)diethanol,
3-(N-2-hydroxyethyl-m-toluidino)bispropionitrile,
1-sec-butyl-1,2,3,4-tetrahydro-7-methyl-3-quinolinol,
1,2,3,4-tetrahydrobenzo [h]-quinolin-3-ol,
2,4-quinolinediol and
4-hydroxy-1-methylcarbostyril.

The above compounds containing hydroxyl groups should be coupled with a diazonium salt containing a 2-hydroxy-3-bromopropylamino group in order to minimize side reactions. An example of a coupling component containing a nitro group which thereafter can be reduced is 3-methyl-1-(p-nitrophenyl)-5-pyrazolone.

Starting materials for the new dyestuffs of the invention containing one or more azo groups can be obtained by an alternative process involving coupling a diazonium compound with a coupling component wherein either the diazonium compound or the coupling component, or both, has attached thereto an amino bromohydrin group. In carrying out this alternative process, the coupling is generally effected at a temperature below about about 5° C., conveniently at a temperature between 0 ond 5° C., and at as low a pH as is efficient with coupling in order to minimize side reactions.

The water-insoluable primary aminoazo colorants used in the invention also include those containing more than one azo group. Useful disazo compounds may be formed by the tetrazotization of an aromatic diamine containing two primary amino groups and coupling the tetrazo compound thus formed with two moles of one of the above-defined amino-bearing coupling components or with one mole of each of two of the above-defined amino-bearing coupling components or with one mole of the above-defined amino-bearing coupling components and one mole of a coupling component having no amino group. Suitable aromatic diamines include benzidine, 3,3'-dimethoxybenzidine, 3,3'-dichlorobenzidine, and 4,4'-diaminostilbene. Another method of forming the disazo or polyazo amines useful in the invention involves the use of the above-described processes with aromatic amines or diamines containing azo groups.

Useful amino anthraquinones include 1-amino-4-methylaminoanthraquinone,
1-amino-4-ethylaminoathraquinone,
1-amino-4-anilinoanthraquinone,
1-amino-4-[(o-, m-, or p-)toluidino]anthraquinone,
1-amino-4-(2,4-xylididino)anthraquinone,
1-amino-4-[(o-, m-, or p-)phenetidino]anthraquinone,
1-amino-4-[(o-, m-, or p-)anisidino]anthraquinone,
1-amino-4-[(o-, m-, or p-)chloroanilino]anthraquinone,
1-amino-4-[(o-, m-, or p-)nitroanilino]anthraquinone,
1-amino-4-cyclohexylaminoanthraquinone,
1-amino-4-dimethyl-aminoanthraquinone,
1-amino-4-(2'-hydroxyethyl)aminoanthraquinone,
1-amino-4-benzylaminoanthraquinone,
1-amino-4-(2-phenylethylamino)anthraquinone,
1-amino-4-(2-napthylamino)anthraquinone,
1-amino-4-(1-naphthylamino)anthraquinone,
1-amino-4-(p-biphenylamino)anthraquinone,
1-amino-4-acetamidoanthraquinone,
1-amino-4-benzamidoanthraquinone,
1-amino-4-p-trifluoromethylanilinoanthraquinone,
1-amino-4-p-cyanoanilinoanthraquinone,
1-amino-4-p-chlorobenzamidoanthraquinone,
1-amino-4-p-anisylamidoanthraquinone,
1-amino-4-p-trifluoromethylbenzamidoanthraquinone, 1-amino-4-(1-tetrahydronaphthylamino)anthraquinone,
1-amino-4-(5-tetrahydronaphthylamino)anthraquinone,
1-amino-4-thiophenoxyanthraquinone,
1-amino-4-(p-thiocresoxy)anthraquinone,
1-amino-4-methoxyanthraquinone,
1-amino-4-phenoxyanthraquinone,
1-methoxy-4-(o-, m-, or p-aminoanilino)anthraquinone,
1-phenoxy-4-(o-, m-, or p-aminoanilino)anthraquinone,
1-amino-4-(o-, m-, or p-aminoanilino)anthraquinone,
1-methylamino-4-(o-, m-, or p-aminoanilino) anthraquinone,
1-ethylamino-4-(o-, m-, or p-aminoanilino)anthraquinone,
1-anilino-4-(o-, m-, or p-aminoanlino)anthraquinone,
1-p-toluidino-4-(o-, m-, or p-aminoanilino)anthraquinone,
1-cyclohexylamino-4-(o-, m-, or p-aminoanilino) anthraquinone,
1-p-toluidino-4-(o-, m-, or p-aminoanilino) anthraquinone,
1-p-anisidino-4-(o-, m-, or p-aminoanilino)anthraquinone,
1-(1-naphthylamine)-4-(o-, m-, or p-aminoanilino) anthraquinone,
1-acetamido-4-(o-, m-, or p-aminoanilino)anthraquinone,
1-benzamido-4-(o-, m-, or p-aminoanilino)anthraquinone,
1-methoxy-4-(2-aminoethylamino)anthraquinone,
1-phenoxy-4-(2-aminoethylamino)anthraquinone,
1-amino-4-(2-aminoethyl-amino)anthraquinone,
1-methylamino-4-(2-aminoethylamino)anthraquinone,
1-ethylamino-4-(2-aminoethylamino)anthraquinone,
1-anilino-4-(2-aminoethylamino)anthraquinone,
1-p-toluidino-4-(2-aminoethylamino)anthraquinone,
1-cyclohexylamino-4-(2-aminoethylamino)anthraquinone,
1-p-toluidino-4-(2-aminoethylamino)anthraquinone,
1-p-anisidino-4-(2-aminoethylamino)-anthraquinone,
1-(1-naphthylamino)-4-(2-aminoethylamino) anthroquinone,
1-acetamido-4-(2-aminoethylamino)anthraquinone,
1-benzamido-4-(2-aminoethylamino)anthraquinone,
1-methyl-4-[p-(p-aminophenyl)anilino]anthraquinone,
1-phenoxy-4-[p-(p-aminophenyl)anilino]anthraquinone,
1-amino-4-[p-(p-aminophenyl)anilino]anthraquinone,
1-methylamino-4-[p-(p-aminophenyl)anilino] anthraquinone,
1-ethylamino-4-[p-(p-aminophenyl)anilino] anthraquinone,
1-anilino-4-[p-(p-aminophenyl)anilino]anthraquinone,
1-p-toluidino-4-[p-(p-aminophenyl)anilino] anthraquinone,
1-p-anisidino-4-[p-(p-aminophenyl)anilino] anthraquinone,
1-(1-naphthylamino)-4-[p-(p-aminophenyl)anilino] anthraquinone,
1-acetamido-4-[p-(p-aminophenyl)anilino] anthraquinone,
1-benzamido-4-[p-(p-aminophenyl)anilino] anthraquinone,
1-methoxy-4-[p-(p-aminophenylmethyl)anilino] anthraquinone,
1-phenoxy-4-[p-(p-aminophenylmethyl)anilino] anthraquinone,
1-amino-4-[p-(p-aminophenylmethyl)anilino] anthraquinone,
1-methylamino-4-[p-(p-aminophenylmethyl)anilino] anthraquinone,
1-ethylamino-4-[p-(p-aminophenylmethyl)anilino]- anthraquinone,
1-anilino-4-[p-(p-aminophenylmethyl)anilino] anthraquinone,
1-cyclohexylamino-4-[p-(p-aminophenylmethyl)anilino] anthraquinone,
1-p-toluidino-4-[p-(p-aminophenylmethyl)anilino] anthraquinone,
1-p-anisidino-4-[p-(p-aminophenylmethyl)anilino] anthraquinone,
1-acetamido-4-[p-(p-aminophenylmethyl)anilino] anthraquinone,
1-benzamido-4-[p-(p-aminophenylmethyl)anilino] anthraquinone,
1-aminoanthraquinone,
2-aminoanthraquinone,
1,4-diaminoanthraquinone,
1,5-diaminoanthraquinone,
1,8-diaminoanthraquinone,
2,6-diaminoanthraquinone,
1-amino-2-bromoanthraquinone,
1-amino-2-chloro-anthraquinone,
1-amino-2-methoxyanthroquinone,
1-amino-2-phenoxyanthraquinone,
1-amino-2-thiophenoxyanthraquinone,
4,4'-diamino-1,1'-dianthrimide,
2-amino-3-bromoanthraquinone,
2-amino-3-chloro-1-bromoanthraquinone,
1-amino-4-bromoanthroquinone,
1-amino-4-chloroanthraquinone,
1-amino-6-chloroanthraquinone,
1-amino-7-chloroanthraquinone,
2-amino-1-chloroanthraquinone,
2-amino-3-chloroanthraquinone,
1-amino-2,4-dibromoanthraquinone,
1-amino-2,3-dibromoanthraquinone,
1-amino-2,3-dichloroanthaquinone,
1-amino-2-methylanthraquinone,
1,4-diamino-2,3-dichloroanthraquinone,
6-amino-3-methyl-7H-dibenz[f,ij]isoquinoline-2,7-(3H)-dione,
6-(p-aminoanilino)-3-methyl-7H-dibenz[f,ij]isoquinoline-2,7-(3H)-dione,
4-amino-1,9-anthrapyrimidine,
4-(p-aminoanilino)-1,9-anthrapyrimidine,
5-amino-1,9-anthra-pyrimidine and 5-(p-aminoanilino)-1,9-anthrapyrimidine.

Colorants of the phthalocyanine series useful in making the dyestuffs of the invention are those free of ionogenic solubilizing groups which contain at least one amino group. The amino group may be attached directly to the benz-rings of the phthalocyanine nucleus or it may be attached through a divalent bridging radical. Useful amines of the phthalocyanine series include copper tetra-(4)-aminophthalocyanine, copper tri-(4)-aminophthalocyanine, copper di-(4)-aminophthalocyanine, copper mono-(4)-aminophthalocyanine, cobalt tetra-(4)-aminophthalocyanine, nickel tetra-(4)-aminophthalocyanine and metal-free tetra-(4)-aminophthalocyanine. Examples of divalent bridging radicals include-phenylene, —CO-phenylene-, —CH$_2$-phenylene-, —SCH$_2$-phenylene-, —SO$_2$CH$_2$-phenylene- —SO$_2$NR-phenylene-CH$_2$-, —SO$_2$NR-arylene-, NRCO-phenylene-, —NRSO$_2$-phenylene-, —SO$_2$O-phenylene, —CH$_2$—, —CH$_2$NR-phenylene-, —CH$_2$NHCO-phenylene-, —SO$_2$NR-alkylene-, —CH$_2$NR-alkylene-, —CONR-phenylene-CH$_2$—, —CONR-arylene-, —SO$_2$—, and —CO—, —SO$_2$-phenylene-, —NH-phenylene, —S-phenylene, —CH$_2$O-phenylene. In the above divalent bridging radicals, R stands for hydrogen, alkyl or cycloalkyl.

The aminophthalocyanines which contain the divalent bridging radicals referred to hereabove can be made by heating together nitro or acylamido derivatives of phthalic acid; phthalic anhydride or phthalic acid imides and the corresponding substituted phthalic acids, anhydrides and imides by conventional methods; e.g., by heating together a mixture of the appropriate phthalic acid derivative or derivatives, urea, cupric chloride, and ammonium molybdate in o-dichlorobenzene at about 150° C. Phthalocyanine cannot be nitrated directly and amino phthalic acids, anhydrides, or imides cannot be converted into the corresponding amino phthalocyanine.

Useful colorants of the nitro series include the substituted derivatives of diphenylamines and phenylnapthylamines, such as N-(2,4-dinitrophenyl)-p-phenylenediamine and N-(2,4,6-trinitrophenyl)benzidine. These derivatives are conveniently made by condensing an arylamine containing a hydrolyzable group such as acylamido-, with an aryl halide containing nitro groups in the o- and/or p-positions; e.g., 2,4-dinitrochlorobenzene, then hydrolyzing the product to the free arylamine.

Thioureas from which the isothiuronium salts of the invention can be made include thiourea, ethylenethiourea, N,N-dimethylthiourea, N,N,N',-trimethylthiourea and N,N,N',N'-tetramethylthiourea.

In preparing the dyestuffs of the invention, the desired primary amine of the azo, anthraquinone, phthalocyanine or nitro series is reacted with at least one mole of epibromohydrin per amino group, as shown hereunder, to form the amino bromohydrin.

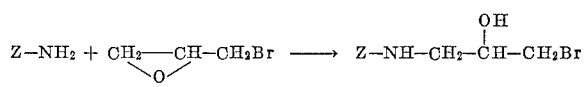

Z in the above equation has the value given aforesaid. Conveniently, the reaction is accomplished by adding to one mole of the amine in glacial acetic acid or formic acid at least one mole of epibromohydrin per free amino group. Reaction is carried out at a temperature between 30 and 80° C., depending on the solvent used. The product amino bromohydrin may partially precipitate during the reaction and the remainder of the product can be insolubilized by adding dilute acetic acid or water. The insoluble product is then recovered by filtration.

Alternatively, the desired bromohydrin can be obtained by reacting an arylamine with at least one mole of allyl chloride or bromide per free amino group, then adding hypobromous acid across the double bond of the soformed allyl amine.

Isothiuronium salts are formed from the amino bromohydrin according to the following equation:

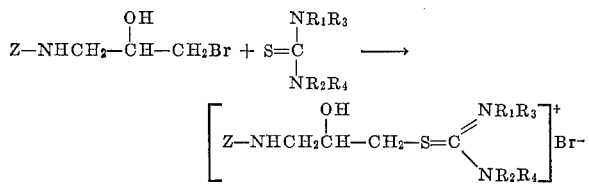

In the above equation Z, $R_1$, $R_2$, $R_3$, and $R_4$ have the values given aforesaid. The reaction is conducted at a temperature between 60 and 125° C. either in aqueous slurry or in a solution using a suitable inert solvent, such as dioxane or a lower alkanol. The product is recovered from the aqueous reaction mixture by drowning the mixture in a large excess of acetone or by salting out the product with an inorganic salt, such as sodium chloride. If a solvent is used, the dyestuff precipitates from the reaction mixture and is recovered by filtration.

The new dyestuffs of the invention are especially suited for the coloration of cellulosic textile materials, such as cotton, linen and viscose rayon, although they also may be effectively applied to silk, wool, nylon, and the like.

The dyestuffs are applied by treating the textile materials in an aqueous solution (which may be a thickened printing paste) of the dyestuff in the presence of an acid-binding agent; for example, sodium hydroxide, sodium phopshate or sodium carbonate. The acid-binding agent may be added to the dye bath either prior to, simultaneously with, or after the addition of the dyestuff.

The dyestuff solution may contain commonly used dye bath adjuvants, such as sodium chloride, sodium sulfate, sodium alginate, urea or water-soluble alkyl ethers of cellulose.

The printing paste may contain commonly used adjuvants, such as urea, and thickening agents; e.g., methyl cellulose, starch and locust bean gum and sodium alginate.

Dyeing in the presence of the acid-binding agent is preferably carried out at elevated temperatures; for example, at temperatures between 60° C. and the boiling point of the dyestuff solution, in order to improve the exhaustion and fixation of the dyestuff. Fixation of the dyestuff results in the linking of the dye to the fiber through the hydroxyl groups of the cellulose.

The textile material printed with printing paste contanining an acid-binding agent is preferably steamed or heated in order to fix the dyestuff on the textile material.

When the acid-binding agent is applied to the textile material before or after the dyestuff, it is preferably applied by treating the fiber with an aqueous solution of the acid-binding agent; i.e., a padding technique. The aqueous solutions of acid-binding agents may also contain the common dye bath adjuvants.

Both the solution of acid-binding agent and dyestuff may be applied at room temperature or at elevated temperatures. The textile material can be dried between the two treatments if desired. It is preferred to heat or steam cellulosic material at an elevated temperature; for example, at 100° C. or higher, for a short period of time after application of the dyestuff and acid-binding agent to fix the dyestuff on the textile material.

The above techniques may be modified by substituting for the acid-binding agent a substance which on heating or steaming generates an acid-binding agent. Such substances include alkali metal bicarbonates which on steaming yield alkali metal carbonates.

The fastness to washing or subsequent wet processing of the colorations produced using our new dyestuffs is improved by a scouring treatment; e.g., applying a hot aqueous solution of soap and sodium carbonate followed by rinsing in hot water prior to drying.

The new dyestuffs may also be applied to silk, wool, regenerated protein, nylon and modified polyarcylonitrile textile materials by using the conventional dyeing methods for those textile materials; i.e., dyeing from weakly acid dye bath solutions; for example, dyestuff solutions containing acetic acid or ammonium sulfate, at a temperature above 80° C. When dyeing proteinaceous fibers in conjunction with an acidic agent, it is preferable to use a temperature between 80° C. and 100° C.

Our invention is further illustrated by the following examples:

EXAMPLE I

*1,4-bis(3'-bromo-2'-hydroxypropylamino)-anthraquinone*

In portions, 47.6 g. (0.20 mol) of 1,4-diaminoanthraquinone is added to a mixture of 43.4 g. of glacial acetic acid and 8.3 ml. of water. To this mixture there is added slowly at 25° C., 23.3 g. (0.16 mol) of epibromohydrin. The temperature is raised to 79° C. during 45 minutes. During three hours and 45 minutes, there is added 59 g. (0.434 mol) of epibromohydrin at 78–82° C. Stirring is continued for 4 hours at 80° C. The mixture is cooled to 20° C., diluted with 98 ml. of 15 volume percent of acetic acid and stirred for one hour. The solid is collected by filtration, broken up in mortar and washed with 200 ml. of 32 volume percent acetic acid then dried under vacuum over calcium chloride and potassium hydroxide. There is obtained 86.4 g. (0.169 mole; i.e., 84%) of 1,4-bis(3-bromo-2-hydroxypropylamino)anthraquinone. Anal.: Calcd. for $C_{20}H_{20}O_4Br_2$ (512.2): Br. 31.2; N, 5.45. Found: Br, 27.2; N, 5.0.

The isothiuronium salt of this product is prepared in the following fashion: At 88° C., 5.12 g. (0.010 mole) of 1,4-bis(3-bromo-2-hydroxypropylamino)anthraquinone is added to a solution of 7.6 g. (0.10 mole) of thiourea and 6 ml. of water. After ten minutes of stirring at 88–97° C., the charge is cooled at once and added to 300 ml. of acetone. The viscous product is caused to solidify by trituration with acetone. It is filtered off and washed with acetone until the washings are only slightly colored, then dried at 50° C. under vacuum. There is obtained 4.45 g. (0.0067 mol) of the blue bis-isothiuronium salt, representing 67 percent of theory. Anal.: Calcd. for $C_{22}H_{28}Br_2O_4N_4S_2$ (664.3): S, 9.65. Found: S, 9.45.

EXAMPLES II–IX

Valuable dyestuffs are prepared according to the procedure of Example I by substituting for the 1,4-diaminoanthraquinone the following intermediates:

| Example No. | Intermediate | Color |
|---|---|---|
| II | 1,4-Diamino-2,3-dicyanoanthraquinone | (Greenish) Blue. |
| III | 1,4,5,8-Tetraaminoanthraquinone | Blue. |
| IV | 1,4-Diamino-2,3-dimethoxyanthraquinone | Violet. |
| V | 1,4-Diamino-2-phenoxyanthraquinone | Red-Violet. |
| VI | 1-Amino-4-cyclohexylaminoanthraquinone | (Reddish) Blue. |
| VII | 1,4-Diamino-5-nitroanthraquinone | Violet. |
| VIII | 1,8-Diamino-2-methylanthraquinone | Do. |
| IX | 1,5-Diamino-4,8-dihydroxyanthraquinone | (Reddish) Blue. |

EXAMPLE X

A one percent solution of the dye of Example 1 is prepared in water and used to pad 80 x 80 print cloth. After an intermediate drying, a portion of the padded cloth is padded a second time with a solution of 5 g. of sodium hydroxide and 200 g. of sodium chloride per liter, then steamed for sixty seconds. A second portion of the cloth padded with the dye is also padded with the sodium hydroxide-sodium chloride solution then, without further drying, held for three minutes in an oven at 150° C. After rinsing, each of the dyed samples exhibits very good wash fastness when tested with hot alkaline soap solution.

EXAMPLE XI 3.74 g. (0.010 mol) of bromohydrin prepared by condensing 1-amino-2-methylanthraquinone with epibromohydrin according to the general procedure of Example I is added to 5.1 g. (0.050 mol) of 2-imidazolidinethione and 4 ml. of water. The mixture is heated quickly to 95° C. and stirred at 94–95° C. for 45 minutes. After cooling, the reaction mass is added to acetone and the product is triturated with several portions of fresh acetone, filtered off, and washed with fresh acetone until the washings are slightly colored. After drying at 50° C. under vacuum, there is obtained 3.8 g. of red dyestuff. Similar useful dyestuffs are obtained by substituting N,N-dimethylthiourea, N,N,N'-trimethylthiourea or N,N,N,N'-tetramethylthiourea for the 2-imidazolidinethione employed in the above example.

EXAMPLE XII

The procedure of Example X is followed using a one percent solution of the dye of Example XI. The fastness of the dyeing to soaping is once again much greater than that of the colorant from which the dyestuff is prepared.

EXAMPLE XIII

The procedure of Example XI is repeated using 1-amino-4-hydroxyanthraquinone (CI 60710) as a starting material. There is obtained in good yield a reddish-violet dye.

EXAMPLE XIV

The procedure of Example XI is repeated using 1,5-diaminoanthraquinone as a starting material. There is obtained in good yield a bluish-red dye.

EXAMPLE XV

The procedure of Example XI is reepated using 6-amino-3-methyl-7H-dibenz[f,ij]isoquinoline-2,7-(3H)-dione as a starting material. There is obtained a good yield a bluish-red dye.

EXAMPLE XVI

The procedure of Example XI is repeated using 1,4-bis(p-aminoanilino)anthraquinone as a starting material. There is obtained in good yield a green dye.

EXAMPLE XVII

The procedure of Example XI is repeated using 1,4-diamino-2-methoxyanthraquinone (CI 60755) as a starting material. There is obtained in good yield a reddish-blue dye.

EXAMPLE XVIII

The procedure of Example XI is repeated using 1-amino-4-acetamidoanthraquinone as a starting material. There is obtained in good yield a violet dye.

EXAMPLE XIX

The procedure of Example XI is repeated using 1-(p-aminoanilino-4-hydroxyanthraquinone as a starting material. There is obtained in good yield a blue dye.

EXAMPLE XX

The procedure of Example XI is repeated using 1-amino-4-anilinoanthraquinone (CI 61110) as a starting material. There is obtained in good yield a greenish-blue dye.

EXAMPLE XXI

The procedure of Example XI is repeated using 1-amino-2-bromo-4-p-toluinoanthraquinone (CI 62100) as a starting material. There is obtained in good yield a greenish-blue dye.

EXAMPLE XXII 37.9 g. (0.10 mol) of bromohydrin is prepared from p-(p-nitrophenylazo)aniline (CI 11005) and epibromohydrin according to the procedure of Example I. A mixture of 26.4 g. (0.20 mol) of N,N,N',N'-tetramethylthiourea and 20 ml. of water is heated quickly to 87° C. After holding at 87–98° C. for twenty minutes, the mixture is cooled and added to a large excess of acetone. The product which precipitates is triturated with several portions of fresh acetone, filtered off, washed with acetone until the washings are nearly colorless, then dried at 50° C. under vacuum to 36.8 g. (72% yield) of orange dye.

EXAMPLES XXIII–XXIV

Valuable dyestuffs are prepared according to the method of Example XXII by substituting the following intermediates for the p-(p-nitrophenylazo)aniline:

| Example No. | Intermediate | Color |
|---|---|---|
| XXIII | 2-Nitro-4-sulfonamidodiphenylamine | Yellow. |
| XXIV | 4,4'-Diamino-3,3'-dinitrodiphenylether | Do. |

EXAMPLE XXV

The procedure of Example X is followed using a one percent solution of the dye of Example XXII. The fastness of the dyeing to soaping is once again much greater than that of the colorant from which the new dyestuff is prepared.

EXAMPLE XXVI 8.94 g. (0.010 mol) of the tetrabromohydrin prepared by condensing epibromohydrin with the brown disazo dye 4,6-bis(4-aminophenylazo)-m-phenylenediamine is added to a solution of 15.2 g. (0.20 mol) of thiourea in 12 ml. of water at 90° C. The mixture is stirred at this temperature until a sample is entirely soluble in water. The reaction mass is cooled, added to a large volume of acetone and the precipitated product is triturated with several portions of fresh acetone until the product has solidified. The product is filtered off, washed well with acetone and dried at 50° C. under vacuum. There is obtained 9.5 g. of dark brown dye, or a yield of 79 percent.

EXAMPLES XXVII–XXX

Valuable dyestuffs are prepared according to the procedure of Example XXVI by substituting for the 4,6-bis(4-aminophenylazo)-m-phenylenediamine the following intermediates:

| Example No. | Intermediate | Color |
|---|---|---|
| XXVII | 1-Phenylazo-2-aminonaphthalene | Yellow. |
| XXVIII | p-[p-Aminophenylazo]-N,N-di-(2-hydroxyethyl)aniline. | Red. |
| XXIX | 2,4-Dinitroaniline→N-ethylaniline | Yellow. |
| XXX | 1-Naphthylamine→m-phenylenediamine | Violet. |

EXAMPLE XXXI

The procedure of Example X is followed using a 1 percent solution of the dye of Example XXII. The fastness of the dyeing to soaping is once again much greater than that of the colorant from which the new dyestuff is prepared.

EXAMPLE XXXII

The procedure of Example XXII is repeated using 4-(4-aminophenylazo)-1-naphthylamine (CI 11365) as a starting material. There is obtained in good yield a bluish-red dye.

EXAMPLE XXXIII

The procedure of Example XXII is repeated using 1-(p-aminophenylazo)-2-methoxynaphthalene as a starting material. There is obtained in good yield an orange-yellow dye.

EXAMPLE XXXIV

The procedure of Example XXII is repeated using 4-(p-anisylazo)-1-naphthylamine as a starting material. There is obtained in good yield a red-violet dye.

EXAMPLE XXXV

The procedure of Example XXII is repeated using 4-amino-4'-dimethylaminoazobenzene (CI 11025) as a starting material. There is obtained in good yield a red dye.

EXAMPLE XXXVI

The procedure of Example XXII is repeated using 4-amino-2',3-dimethylazobenzene (CI 11160) as a starting material. There is obtained in good yield a scarlet dye.

EXAMPLE XXXVII

The procedure of Example XXII is repeated using as a dyestuff the product p-nitroaniline→1-naphthylamine→dimethylaniline followed by reduction of the nitro to amino, as a starting material. There is obtained in good yield a red dye.

EXAMPLE XXXVIII

The procedure of Example XXII is repeated using CI 11385 as a starting material. There is obtained in good yield a reddish-violet dye.

EXAMPLE XXXIX

The procedure of Example XXII is repeated using as a dyestuff the product 4,4'-aminoazobenzene⇌2-cresidine There is obtained in good yield a bordeaux dye.

EXAMPLE XL

The procedure of Example XXII is repeated using as a dyestuff the product p-aminoacetanilide→1-phenyl-3-methyl-5-pyrazolone, followed by hydrolysis of the acetyl group. There is obtained in good yield a yellow dye.

EXAMPLE XLI

Copper tetra-(4)-aminophthalocyanine is condensed with epibromohydrin according to the procedure of Example I to form the tetrabromohydrin. 0.010 mol of this product is reacted with aqueous thiourea according to the procedure of Example IV to give the blue tetraisothiuronium salt.

EXAMPLE XLII

The procedure of Example X is followed using a one percent solution of the dye of Example XLI. The fastness of the dyeing to soaping is once again much greater than that of the colorant from which the new dyestuff is prepared.

EXAMPLE XLIII 10.6 g. (0.020 mol) of the bromohydrin prepared by condensing epibromohydrin with N-(2,4,6-trinitrophenyl)benzidine is added to a solution of 23.6 g. (0.20 mol) of N,N,N'-trimethylthiourea and 20 ml. of water at 90° C. The mixture is stirred at this temperature until an aliquot is entirely soluble in water, then cooled. Upon adding to a large excess of acetone, a solid precipitates which, after trituration with frseh portions of acetone, is filtered off, washed with acetone, and dried at 50° C. under vacuum. There is obtained 11.8 g. (91% yield) of orange dye.

EXAMPLE XLIV

The procedure of Example X is followed using a one percent solution of the dye of Example XLIII. The fastness of the dyeing to soaping is once again much greater than that of the colorant from which the dyestuff is prepared.

EXAMPLE XLV

At 25° C., cotton yarn is immersed in a bath containing two percent (on the weight of the goods) of the dye prepared according to Example I. Sodium chloride (150 percent on the weight of the goods) is added and the bath is raised to 60° C. during one hour. During this time, a total of 24 percent (on the weight of the goods) of trisodium phosphate is added gradually. The dyed yarn is rinsed, soaped, and dried. It exhibits very good wet fastness.

EXAMPLE XLVI

Wool yarn is dyed for one hour at 88° C. in a 1:30 dyebath containing ten percent of sodium carbonate (on the weight of the goods) and two percent of the dye prepared in Example I. After rinsing, the dyed material exhibits very good wet fastness.

Alternatively, the yarn is immersed for one-half hour at 88° C., in a two percent solution of the dye prepared in Example I. There is then added three percent (on the weight of the goods) of 85 percent formic acid and the dyeing is continued for another one-half hour. After rinsing, the goods are treated for one-half hour at 88° C. with a solution containing one gram of soap and four grams of soda ash per liter. The goods are rinsed and dried. The dyed yarn possesses very good wet fastness.

EXAMPLE XLVII

Nylon yarn is dyed according to the procedures of Example XLVI. Once again, surprisingly good wet fastness is exhibited by the dyed goods.

We claim:

1. A dyestuff of the formula:

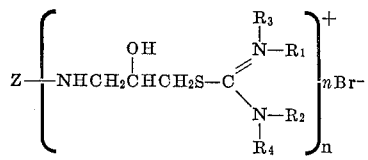

wherein Z is a water-insoluble aromatic dyestuff moiety selected from the group consisting of azo, anthraquinone, phthalocyanine and nitro; $R_1$ and $R_2$, as individual substituents, are members selected from the group consisting of hydrogen and lower alkyl and, taken collectively, represent an alkylene bridge having from 2 to 3 carbon atoms, said bridge connecting the N atoms to which $R_1$ and $R_2$ are attached; $R_3$ and $R_4$ are members selected from the group consisting of hydrogen and lower alkyl; and $n$ is an integer having a value of from 1 to 4, the amino nitrogen attached to Z being directly linked to an aromatic carbon atom of the Z moiety.

2. A dyestuff of claim 1 wherein Z is azo, $R_1$, $R_2$, $R_3$ and $R_4$ are hydrogen and $n$ is one.

3. A dyestuff of claim 1 wherein Z is anthraquinone, $R_1$, $R_2$, $R_3$, and $R_4$ are hydrogen and $n$ is two.

4. A dyestuff of claim 1 wherein Z is phthalocyanine, $R_1$, $R_2$, $R_3$, and $R_4$ are hydrogen and $n$ is four.

5. A dyestuff of claim 1 wherein Z is nitro, $R_1$, $R_2$, $R_3$, and $R_4$ are hydrogen and $n$ is one.

No references cited.

CHARLES B. PARKER, *Primary Examiner.*

FLOYD D. HIGEL, *Assistant Examiner.*